Patented Aug. 13, 1940

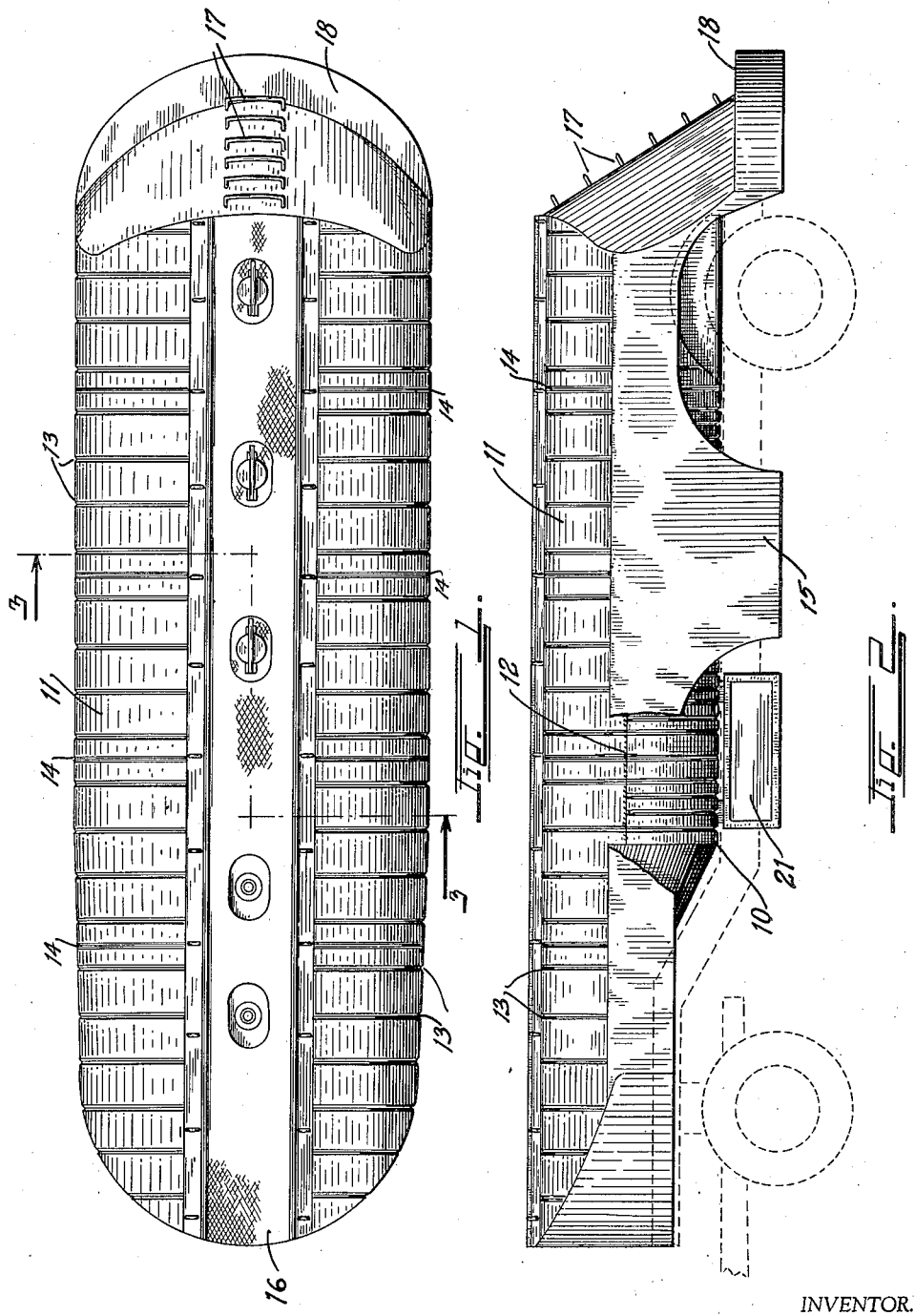

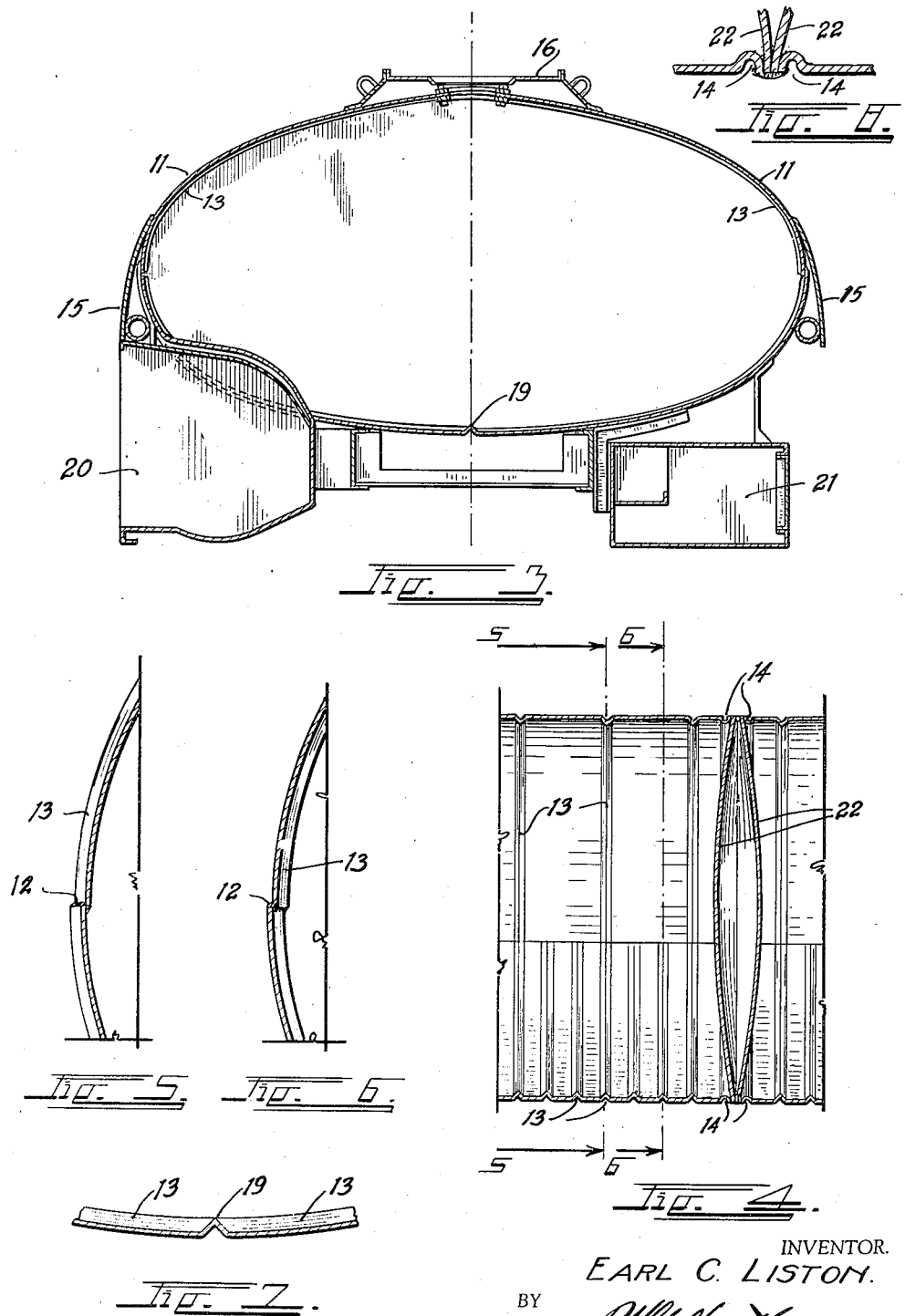

2,211,239

UNITED STATES PATENT OFFICE 2,211,239

TANK CONSTRUCTION FOR TRAILERS AND TRUCKS

Earl C. Liston, Denver, Colo.

Application May 3, 1938, Serial No. 205,733

1 Claim. (Cl. 220—22)

This invention relates to a tank construction for vehicles, more particularly the type of tank used as a trailer or semi-trailer for the transportation of gasoline.

The principal object of this invention is to provide a tank construction which will substantially decrease the metal weight of the tank without reducing the strength and rigidity thereof so as to increase the amount of pay load which can be carried with the same wheel loading. All vehicle tanks up to the present time have been constructed of low tensile steel, of relatively low tensile strength. High tensile steel sheets have been available but no reduction in weight could be obtained by their use due to the fact that sheets of a certain thickness of gauge have been heretofore necessary in order to prevent buckling, vibration, and distortion. Therefore it was necessary to use the same thickness or weight regardless of the tensile strength and, due to the cheaper cost of the low tensile steel, the latter is being used.

By the use of this invention, the relatively thin, light, high tensile sheets can be used with the resultant saving in weight without sacrificing the vibration resisting qualities of the heavier thicker sheets. This improved construction allows sheets of 16 gauge high tensile steel sheets to be used in the tank where formerly 10 gauge sheets were required. This results in a saving of from 25 to 50 per cent in weight and yet produces a tank which will have more strength, more rigidity and less vibration than the present heavy gauge tanks.

By employing this invention, a 2,750 gallon semi-trailer tank was constructed without increasing the wheel load over the standard 2,000 gallon tank. The saving in sheet metal weight allowed the storage of 750 gallons of additional gasoline.

Another object of the invention is to provide partitions for a sheet metal tank of a design which will enable them to be constructed of gauge, high tensile steel without sacrificing the rigidity or increasing the vibration thereof and to so construct the partitions and tank that all welding may be done from the exterior.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a plan view of a semi-trailer tank in which the new construction is embodied.

Fig. 2 is a side view thereof with the skirt portion partially broken away.

Fig. 3 is an enlarged cross section through the tank taken on the line 3—3, Fig. 1.

Fig. 4 is a fragmentary, longitudinal section of the tank illustrating the partition construction.

Figs. 5 and 6 are detail, enlarged sections through the tank wall taken on the lines 5—5 and 6—6, respectively, of Fig. 4.

Fig. 7 is a similar detail section through the bottom of the tank.

Fig. 8 is an enlarged detail section illustrating the joint between the tank sections and the partition plates.

The tank is formed in sections separated by partition plates 22. The bottom of each section is formed from a single sheet 10 and the top portion by a single sheet 11. The two sheets are joined along a longitudinal, horizontal welded seam 12.

It is preferred to form the bottom plates 10 of a slightly heavier gauge metal than the top plates 11. In actual practice, it has been found highly satisfactory in the larger tanks to form the bottom of #14 gauge steel and the top of #16 gauge steel. The saving of weight is readily apparent when these gauges are compared with the usual #10 gauge of the entire tank.

Both the top and bottom sheets are formed with parallel, laterally extending, V-shaped, indented beads 13 rolled into the metal of the sheet. The beads in the upper sheet 11, due to the less weight thereon, are spaced further apart than the beads in the bottom sheet 10, as illustrated. A similar bear 19 extends throughout the length of the medial line of the tank bottom to increase the resistance of the bottom plates to bending strains. It has been found that these circumferential extending, V-shaped beads impart a stiffness and rigidity to a 16 gauge tank equal to that of the usual or 10 gauge tank.

The lighter gauges in the high tensile steel supply ample tensile strength to prevent bursting of the tank and the V-shaped beads supply ample stiffness and rigidity.

The partitions in the usual tank, due to their great area are formed of heavy gauge steel to prevent vibration and to prevent buckling between a full compartment and an empty one.

In this tank, however, the partitions 22 are formed from two dished or concaved plates which are brought together around their entire peripheries and which are spaced-apart at their middles. The peripheral edges of the two plates 13 are brought between two sections of the tank proper as shown in Fig. 4. The sections are beaded at their extremities as shown at 14 so as to turn the extreme edges outward against the edges of the plates 22. The entire assembly of plates and section is then welded together on the exterior, as shown in Fig. 8, without requiring the welders to enter the tank.

This construction allows the partition plates to be made of much lighter gauge than the usual partition plates. In fact, the weight of the two plates together does not equal the weight of the usual single plate, yet, due to the dished construction of the plates they form a partition equal in rigidity and vibration resisting qualities to the usual heavy plates. It can be readily seen that neither plate can collapse toward the other, due to its tied edges, without expanding the entire tank and such expansion is impossible since the tank is formed in a complete welded circle. Therefore, a partition of maximum strength is produced with a minimum of weight.

The completed tank may be provided with skirts 15, walk way 16, ladder 17, bumper 18, barrel rack 20, and can rack 21, if desired.

Up to the advent of this invention, gasoline truck tanks were uniformly constructed of #10 gauge steel of 55,000 lbs. per square inch tensile strength and the weight of the entire job including skirt, barrel rack, can rack and other accessories was figured at 3 lbs. per gallon of pay load. This construction allows the thin sheets, #14 and #16 gauges, of 75,000 lb. tensile strength steel to be used and the truck tanks, fully equipped, weigh 1.22 lbs. per gallon of pay load— a saving of 3,560 lbs. in a 2,000 gallon tank.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:

A tank construction comprising: a longitudinal series of inverted, trough shaped top plates; a longitudinal series of trough shaped bottom plates, the horizontal, longitudinal edges of each of said bottom plates overlapping the horizontal, longitudinal edges of one of said top plates, said longitudinal edges being welded together; a bead indented along the lateral edges of all of said plates so as to direct the extreme edges outwardly; a pair of even surfaced dished partition plates with their concave sides facing each other, said partition plates being welded together around their peripheries and being welded to the outwardly turned edges of the adjacent trough-shaped plates to hold them in place therebetween.

EARL C. LISTON.